June 5, 1934.     H. G. CARLSON ET AL     1,961,581
FLOOD VALVE
Filed March 15, 1928     3 Sheets-Sheet 1
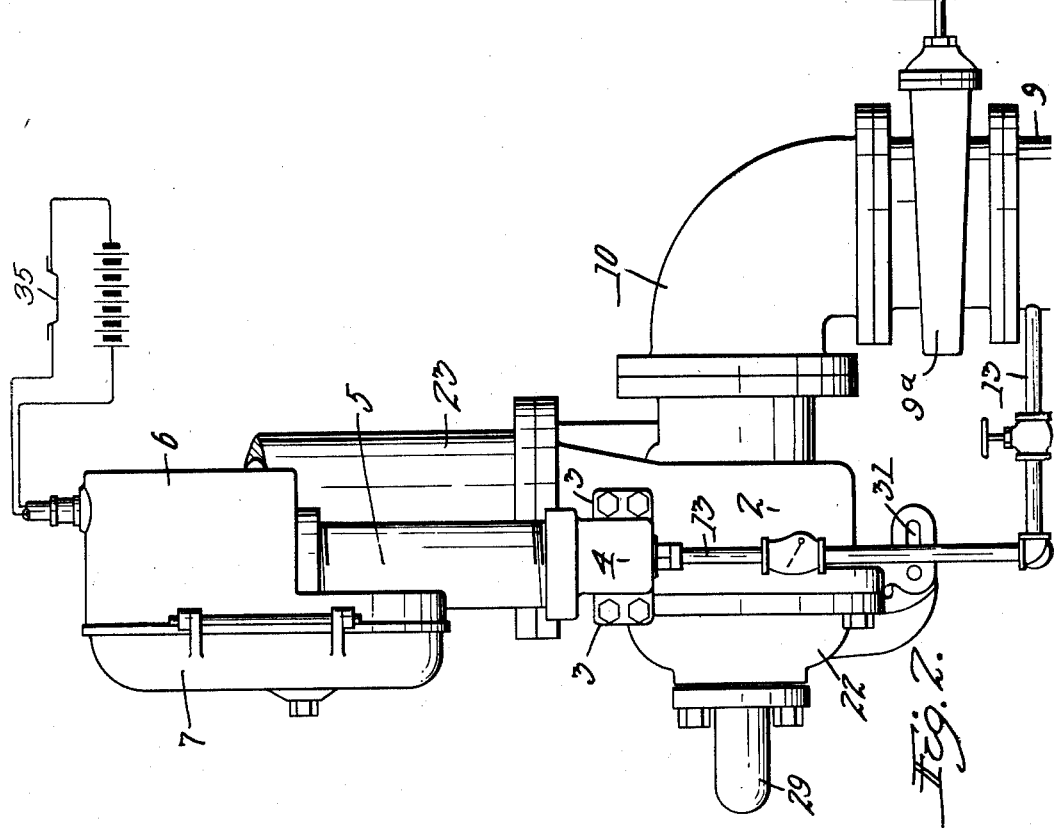
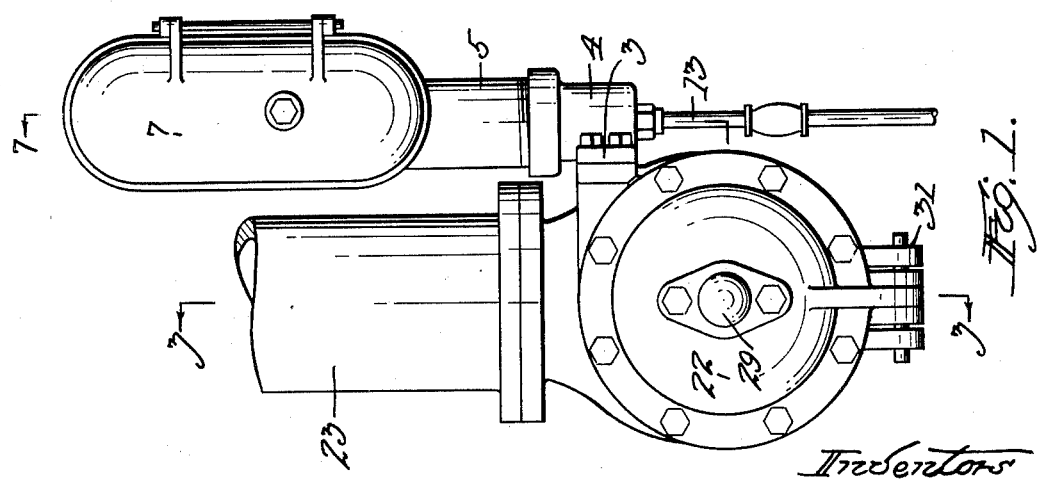

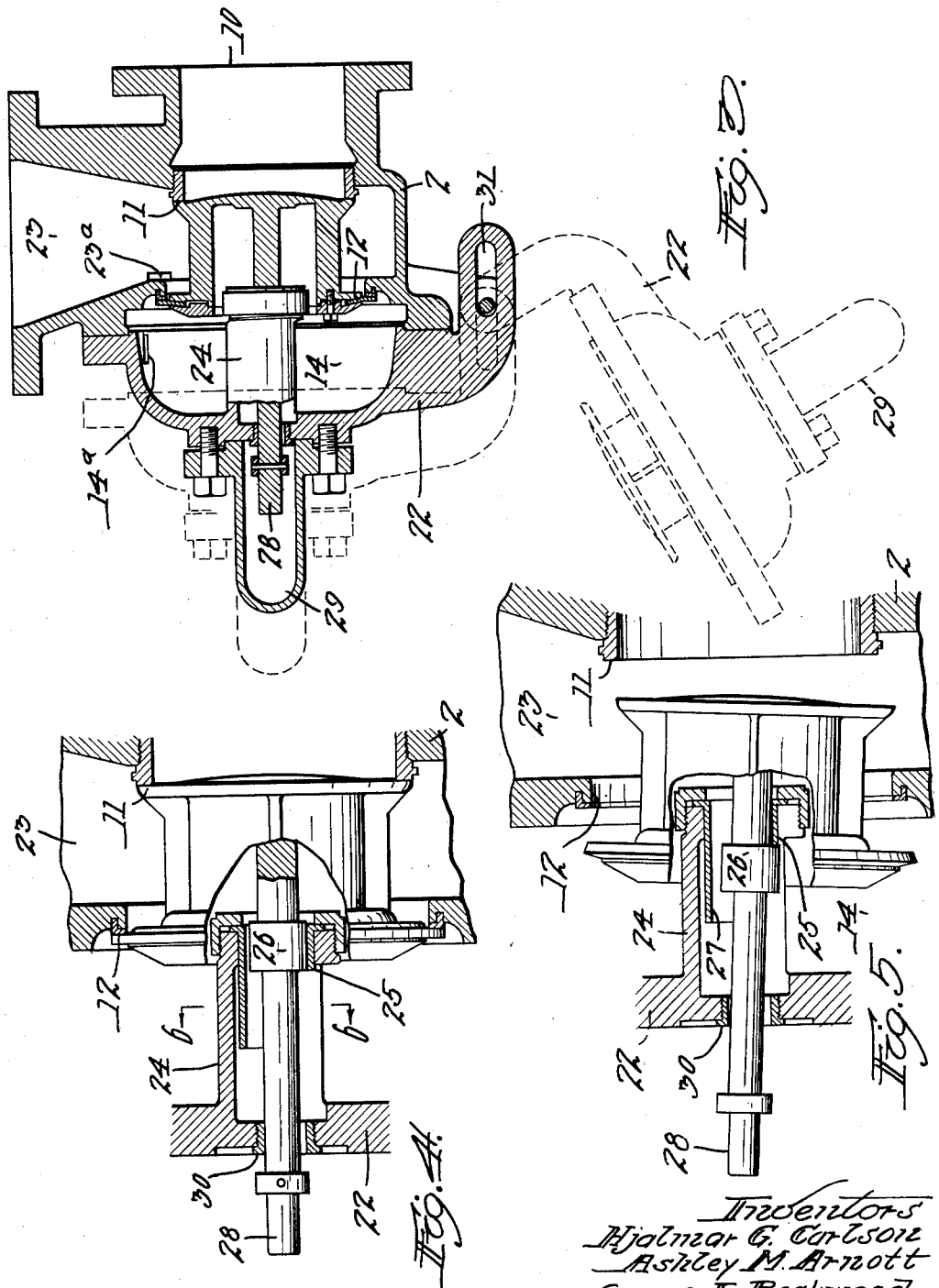

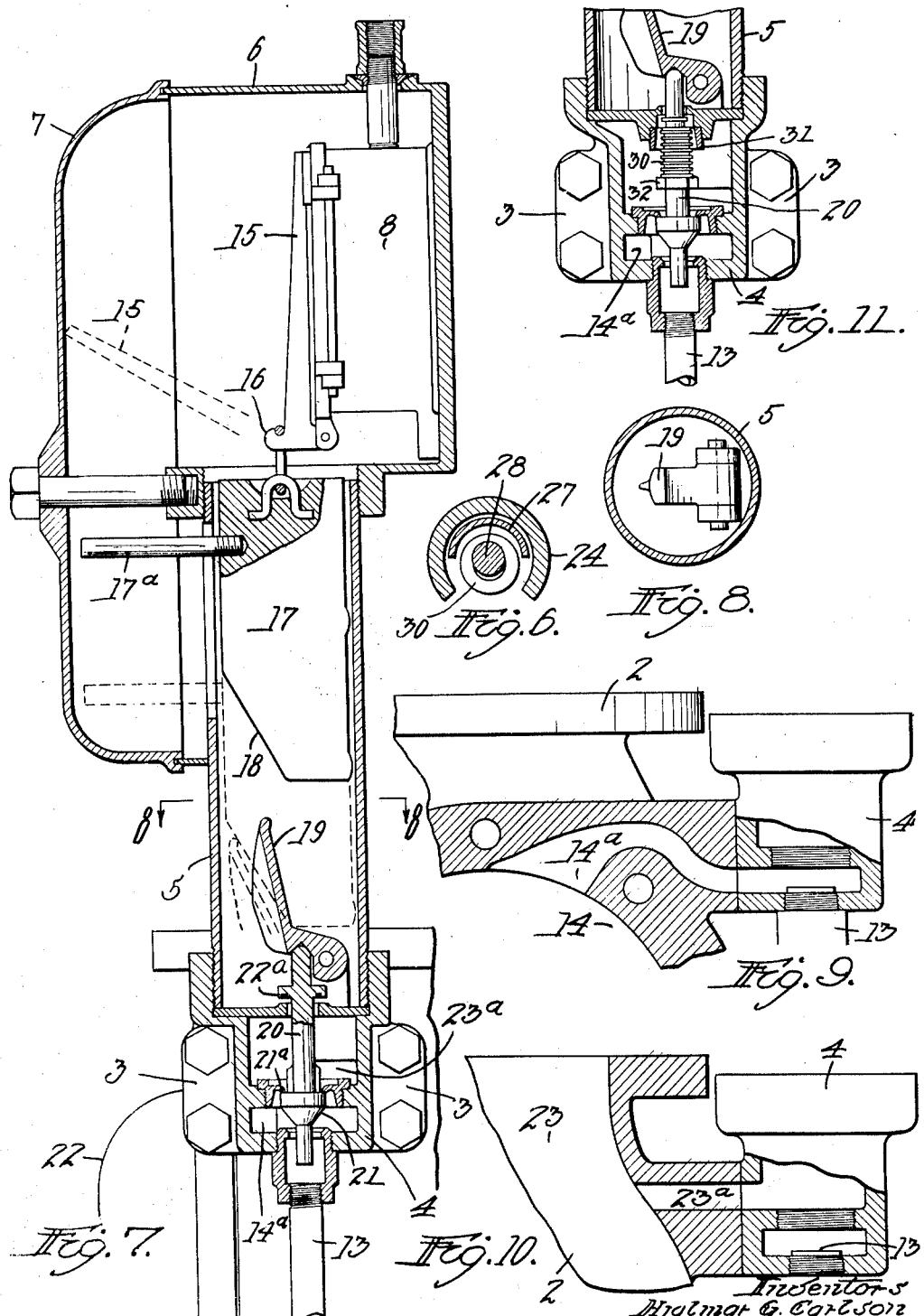

Patented June 5, 1934

1,961,581

UNITED STATES PATENT OFFICE 1,961,581

FLOOD VALVE

Hjalmar G. Carlson, Ashley M. Arnott, and George I. Rockwood, Worcester, Mass., assignors to Rockwood Sprinkler Company of Massachusetts, Worcester, Mass., a corporation of Massachusetts Application March 15, 1928, Serial No. 262,008

2 Claims. (Cl. 137—139)

This invention relates to a valve of the flood type such as is used in celluloid factories, "duco" body painting shops, etc., where it may be necessary to suddenly flood an area upon the melting of a fusible connection or the operation of a thermostat in a fire. Speed in operation is the governing condition.

The principal objects of the invention are to provide a construction of this kind with means whereby, normally, there will be an unbalanced pressure from the supply main to hold the main valve closed; to provide for practically instantaneous operation; to provide for permitting escape of water from the casing behind the main valve, thus reducing the pressure on the larger area of the valve and leaving the pressure unbalanced, so that the pressure in the main will open this valve; to provide a latch for the stem of the main valve by means of which after the main valve is once opened it positively will be prevented from closing again, even though there might be a pressure behind it to tend to cause that action; and also to provide a construction in which a cover for the valve casing and containing the space behind the valve, can be moved longitudinally and then swung back, taking the entire valve with it and thus making inspection of the valves and seats easy.

Other objects and advantages of the invention will appear hereinafter.

Reference is to be had to the accompanying drawings in which

Fig. 1 is an end view of a flood valve system embodying this invention;

Fig. 2 is a side view;

Fig. 3 is a central sectional view on the line 3—3 of Fig. 1, enlarged;

Figs. 4 and 5 are similar views on enlarged scale with parts omitted, showing two positions of the parts;

Fig. 6 is a sectional view on the line 6—6 of Fig. 4;

Fig. 7 is a sectional view on the line 7—7 of Fig. 1;

Fig. 8 is a sectional view on the line 8—8 of Fig. 7;

Figs. 9 and 10 are sectional views on enlarged scale illustrating certain connecting passages; and Fig. 11 is a sectional view like the lower part of Fig. 7 showing a modification.

The invention is shown in a form in which a high pressure water pipe 10 is connected with a valve casing 2, on which, by means of ears 3, is mounted a casing 4 having a tube 5 extending up from it and supporting a casing 6 having a cover 7. Within this casing 6 is located an electro-magnetic device 8 adapted to be disconnected from a source of power by any usual thermostat, and having a circuit closing contact 35. The pipe 10 is connected with a riser 9 through a gate valve 9$^a$. The riser 9 delivers water from a point below the gate valve through a by-pass pipe 13 having a soft or rubber check valve and a hand valve for controlling it and delivering into the bottom of the casing 4.

The supply from the pipe 10 is shut off by a valve 11 in the casing 2. Rigidly connected with this valve is a larger valve 12. The water from the supply main is connected through a by-pass pipe 13 to the air space 14 behind the larger valve 12 through a passage 14$^a$. The pressure per square inch on both sides of these valves being the same and the area of the valve 12 being greater than that of the valve 11, the two valves will normally remain closed. An outlet 23 into the sprinkler system communicates freely with an air chamber between the valves 11 and 12.

In order to allow this double valve to open, the electric current is reduced or broken through the magnet in the casing 8 by the melting of a fusible disc or the action of a thermostat. This releases a pivoted arm 15 and allows it to swing to the dotted position in Fig. 7. This arm has a hook 16 which normally holds up a weight 17. When allowed to swing out, the weight drops and a cam or slanting surface 18 thereon engages a lever 19 and forces down a plunger 20 which is provided with a double-faced valve 21 and a lead faced valve 22$^a$. The lower conical face of the valve 21 is set so that, when closed as nearly as possible, it allows a little leakage past it. This action of the plunger closes the lower valve and almost stops the the admission of water through the pipe 13, and it also opens the upper one on the valve seat 21$^a$, allowing the sudden escape of first air and then water from the space 14 into the sprinkler system through the outlet 23.

This suddenly releases the pressure in the space 14, unbalances the valves 11 and 12, and allows the main valve to open and the water to flow freely from the pipe 10 into the outlet 23. This outlet is connected by a passage 23$^a$ with the casing 4 above the valve 21. Thus the water used to hold the valve closed passes into the fire sprinkler system suddenly instead of slowly draining out into the air.

It will be seen that the cover 22, with which the casing 2 is provided, has a central rigid projection 24 having a bushing 25 in which normally rests an enlargement 26 on a stem 28 rigidly connected with the valve 11. This centers this valve and holds it in central position. Also fixed to the bushing 25 is a guide 27 for the enlargement 26.

Now when the valve 11 moves back, the stem 28 and the enlargement 26 also move back, and just as soon as it is out of the bushing 25, the enlargement 26 will come down slightly by gravity, and thus the shoulder at the edge of it will engage the end of this bushing and constitute a fixed latch or stop which will positively prevent the valve from closing again, no matter what hydraulic conditions may arise. The length of the stem 28 is enough to prevent the valve from tipping more than slightly, as shown in Fig. 5.

The cover 22 is provided at the end with a bushing 30 having a passage through it large enough to permit of this stem swinging down in this way. The whole cover 22, being released by unscrewing its bolts, can be moved outwardly in an axial direction owing to the pin-and-slot connection 31, and then can be swung down about the pin after it clears the stationary part. It will be understood that this takes with it the valves 11 and 12 and the associated parts. A small removable cap 29 is mounted on the cover 22ᵃ to receive the valve stem 28.

In order to set the device after it has been installed in a sprinkler system as described, the small cap 29 is temporarily removed, thereby permitting the valve stem 28 to be grasped by the hand, and the valve assembly 11, 12 and 28 thrust into closed position as shown in Fig. 3. Having replaced the cap 29, the cover 7 is opened and the weight 17 is raised by its handle 17ᵃ on to the hook 16 which is held in the supporting position by the attraction of the electro-magnet at the end of the arm 15. Then, upon opening the valve controlling the pipe 13, water is admitted below the valve 21 and raises it to its seat 21ᵃ. The water also passes through the passage 14ᵃ to the space 14 and presses the valves 11 and 12 to their seats. The next step is to open the gate valve 9ᵃ, hitherto closed, and admit pressure to the face of the valve 11. This valve will not be opened thereby because of the greater pressure previously established on its other side by the water in the space 14 acting on the larger surface of the valve 12.

Now from the operation of the thermostat or the melting of a fusible link, or due to the cutting off of the current from any cause, the electro-magnet is starved until it will no longer hold up the lever 15. The lever 15 tips over and drops the weight 17. This closes the valve 22ᵃ and brings the valve 21 down to its seat. It is not necessary that this valve fit it tightly but, preferably, it is arranged so a little leakage can pass through it.

The upper valve seat 21ᵃ is thrown wide open, of course. This allows the pressure on the valve 11 to over-balance that on the valve 12, because as there is now free communication from the space 14 to the space 23 through the two passages 14ᵃ and 23ᵃ and the upper valve seat 21ᵃ, the water and air already in the valve space 14 instantly escape into the fire extinguisher system through the outlet 23. This whole valve assembly therefore becomes unbalanced and opens almost instantaneously and immediately allows water under the full pressure from the pipe 10 to pass directly into the outlet 23 and to the sprinkler system.

It will be noticed that the space 14ᵃ is sinuous and when the water passes into it air may be trapped in it and in the space 14. The effect of having a part of this space filled with compressed air is to quicken the opening motion of the valves, as air will move faster than an equal volume of water. It is desirable, however, to trap some water around the valve 21ᵃ to preserve the soft seat of the valve.

In the form shown in Fig. 11 the operation is the same as in that shown in Fig. 7 but instead of having the valve 22ᵃ for closing the port to the casing 5, a corrugated flexible expansible tube 30 is employed for closing this opening, being held in by a bushing 31 and connected with the valve stem 20 by a nut 32. The operation is substantially the same as in the other case.

Although we have illustrated and described only two forms of the invention, we are aware of the fact that other modifications can be made therein by any person skilled in the art without departing from the scope of the invention as expressed in the claims. Therefore, we do not wish to be limited in these respects, but what we do claim is:—

1. In a flood valve, the combination with a valve casing having two passages therein having valve seats of different sizes, a double valve having two valve members of different sizes adapted to close said seats, means for normally applying the same water pressure to both valves to keep them closed, means for relieving the pressure on the larger valve member so as to allow the double valve to become unbalanced, a stem on the double valve, and a cover having a passage therethrough for the stem and a bushing, the valve stem having an enlargement normally fitting said bushing but adapted when the valve moves from its seat to move beyond its bushing, said valve being arranged to tilt when it is free, whereby said enlargement constitutes a latch to prevent the accidental closing of the double valve after it is opened.

2. In a flood valve, the combination with a valve casing having two passages therein having valve seats of different sizes, a double valve having two valve members of different sizes adapted to close said seats, a stem on the double valve, and a cover having a passage therethrough for the stem and a bushing, the valve stem having an enlargement normally fitting said bushing but adapted when the valve moves from its seat to move beyond its bushing, said valve being arranged to tilt when it is free, whereby said enlargement constitutes a latch to prevent the accidental closing of the double valve, said cover being connected with the casing to move axially and to swing away from the casing to permit the re-setting of the valve.

HJALMAR G. CARLSON.
GEORGE I. ROCKWOOD.
ASHLEY M. ARNOTT.